United States Patent [19]
Moore

[11] Patent Number: 5,475,374
[45] Date of Patent: Dec. 12, 1995

[54] METHOD AND APPARATUS FOR ENERGY CONSERVATION IN A COMMUNICATION SYSTEM

[75] Inventor: Morris A. Moore, Wellington, Fla.

[73] Assignee: Motorola, Inc., Schaumburg, Ill.

[21] Appl. No.: 188,880

[22] Filed: Jan. 31, 1994

[51] Int. Cl.⁶ .............................. H04Q 7/00; H04B 7/00
[52] U.S. Cl. ................ 340/825.22; 340/825.27; 340/825.47; 340/825.44; 455/38.3; 455/343
[58] Field of Search ................... 340/825.22, 825.26, 340/825.27, 825.44, 825.47; 455/343, 38.3

[56] References Cited

U.S. PATENT DOCUMENTS

| | | | |
|---|---|---|---|
| 4,845,491 | 7/1989 | Fascenda et al. | 340/825.47 |
| 4,860,003 | 8/1989 | DeLuca et al. | 340/825.47 |
| 4,868,866 | 9/1989 | Williams, Jr. | 340/825.26 |
| 4,887,077 | 12/1989 | Irby, III et al. | 340/825.47 |
| 4,916,539 | 4/1990 | Galumbeck | 340/825.47 |
| 5,045,848 | 9/1991 | Fascenda | 340/825.26 |
| 5,122,795 | 6/1992 | Cubley et al. | 340/825.44 |
| 5,309,154 | 5/1994 | Mun et al. | 340/825.47 |
| 5,347,268 | 9/1994 | Nelson et al. | 340/825.44 |

Primary Examiner—Donald J. Yusko
Assistant Examiner—Edward Merz
Attorney, Agent, or Firm—James A. Lamb

[57] ABSTRACT

A portable radio device (106) has a first operational mode and a second operational mode, and includes a receiver (314), a controller (315), and a mode control device (350). The receiver (314) receives an indexed information message. The controller (315) stores an authorized information field list and is coupled to the receiver (314). The controller (315) decodes the indexed information message, generates an index portion of the decoded indexed information message, and generates a mode control schedule determined by the index portion and the authorized information field list. The mode control device (350) is coupled to the controller (315) for controlling the first and second modes of the portable radio device according to the mode control schedule.

20 Claims, 7 Drawing Sheets

METHOD AND APPARATUS FOR ENERGY CONSERVATION IN A COMMUNICATION SYSTEM

FIELD OF THE INVENTION

This invention relates in general to portable radio devices and in particular to an energy saving method and apparatus for use in a radio communication system having portable radio devices.

BACKGROUND OF THE INVENTION

In radio communication systems having portable radio devices, such as paging systems, personal radiotelephone systems, and portable two way radio systems, energy conservation is among the most important product design concerns, for the purpose of prolonging the duty cycle of the energy storage devices, which are generally batteries. Known means of accomplishing such energy conservation in portable radio devices, which have been used successfully, are the use of electronic devices chosen for their low power requirements, such as liquid crystal displays, the use of logic and radio frequency devices that operate at low voltages, such as one volt, and the use of low power modes whenever possible, including the shut down of the radio receiver when the portable device can establish that no information intended for the portable is being transmitted, such as in a synchronous or partially synchronous systems, wherein pre-designated time slots are assigned to individual portable devices for at least a portion of the time.

However, the use of very long messages, such as news and stock market information, containing information intended for all of, or a large group of, the portable devices in a communication system, is becoming more common. In this case, the portable device is in the normal power mode during the long message and therefore does not conserve power very well.

Thus, what is needed is a means to conserve power in a portable radio device when long messages are being transmitted to the radio device.

SUMMARY OF THE INVENTION

Accordingly, in a first aspect of the present invention, a radio system for communicating information to one or more portable radio devices having a first operational mode and a second operational mode includes a central control terminal and the one or more portable radio devices. The central control terminal includes an information index means for generating an encoded indexed information message having an index portion and an information portion, and transmission means coupled to said information index means for transmitting the encoded indexed information message. The information portion comprises at least one information field and the index portion comprises, on a one to one basis, at least one corresponding pointer indicating a location of the corresponding information field. The one or more portable radio devices each includes a receiver for receiving the index portion and the information portion of the encoded indexed information message, a controller, and a mode control means. The controller stores an authorized information field list and is coupled to the receiver. The controller decodes the encoded indexed information message, processes the index portion and the information portion of the decoded indexed information message, and generates a mode control schedule determined by the index portion of the encoded indexed information list and the authorized information field list. The mode control means is coupled to the controller means for controlling the first and second operating modes of the portable radio device according to the mode control schedule.

Accordingly, in a second aspect of the present invention a portable radio device has a first operational mode and a second operational mode, and includes a receiver, a controller, and a mode control means. The receiver receives an indexed information message. The information portion comprises at least one information field and the index portion comprises, on a one to one basis, at least one corresponding pointer indicating a location of the corresponding information field. The controller stores an authorized information field list and is coupled to the receiver. The controller decodes the indexed information message, including an index portion of the decoded indexed information message, and generates a mode control schedule determined by the index portion and the authorized information field list. The mode control means is coupled to the controller for controlling the first and second modes of the portable radio device according to the mode control schedule.

Accordingly, in a third aspect of the present invention, a method in a portable radio device having a first operational mode, a second operational mode, and a authorized information field list stored therein, includes the steps of receiving an indexed information message which has an index portion and an information portion; determining from the index portion and the authorized information field list a mode control schedule; and controlling the first and second operational modes of the portable radio device according to the schedule. The information portion comprises at least one information field and the index portion comprises, on a one to one basis, at least one corresponding pointer indicating a location of the corresponding information field. Accordingly, in a fourth aspect of the present invention, a method in a radio communication system having one or more portable radio devices and information messages intended for reception by the portable radio devices comprises a plurality of steps. The method is for controlling, during an information portion of the information messages, first and second modes of a portable radio device. The method includes steps of generating, transmitting, receiving, storing, and controlling. The step of generating generates, within a system controller, a message including an authorized information field list intended for the portable radio device. The step of transmitting transmits, from the system controller, the message intended for the portable radio device. The step of receiving receives the message at the portable radio device. The step of storing stores the authorized information field list within the portable radio device. The step of controlling controls the first and second operational modes of the portable radio device during the reception of an information portion of a subsequently received indexed information message in response to an index portion of the subsequently received indexed information message and the stored authorized information field list. The information portion comprises at least one information field and the index portion comprises, on a one to one basis, at least one corresponding pointer indicating a location of the corresponding information field. The step of controlling further includes the steps of receiving an indexed information message comprising an index portion and an information portion, determining from the index portion of the indexed information message and the authorized information list a mode control schedule, and controlling the first and second modes of the portable radio device according to the schedule.

DETAILED DESCRIPTION OF THE INVENTION

Figure 1:
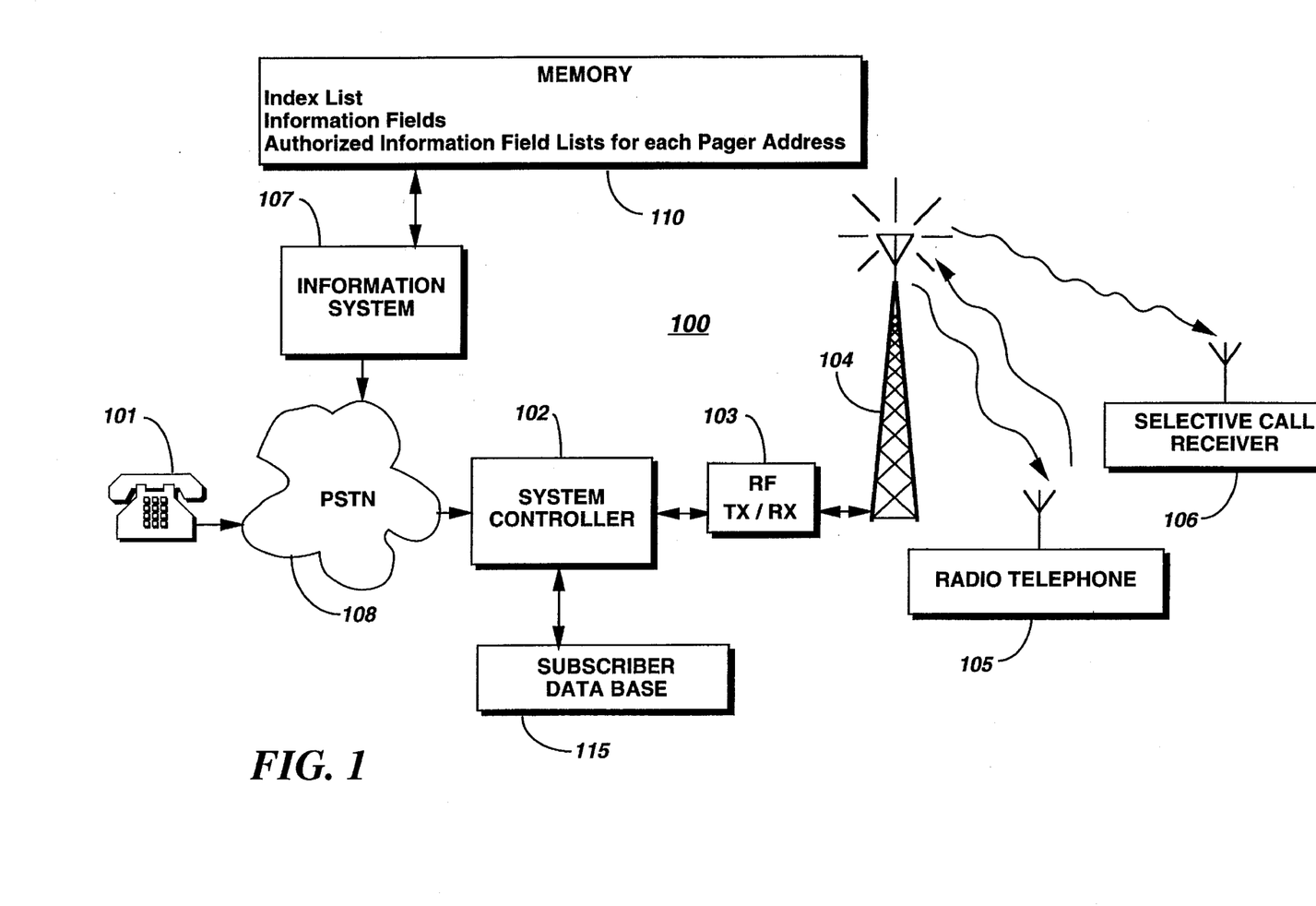
FIG. 1 is an electrical block diagram of a radio communication system suitable for use with the preferred embodiment of the present invention.

Referring to FIG. 1, the preferred embodiment of a radio communication system 100 comprises a telephone 101 and information system 107 connected by a conventional public switched telephone network (PSTN) 108 to a system controller 102 which oversees the operation of a radio frequency transmitter/receiver 103 and which encodes and decodes inbound and outbound addresses into formats that are compatible with land line and personal radio telephone addressing requirements. The system controller 102 can also function to encode paging messages for transmission by the radio frequency transmitter/receiver 103. Telephony signals and data messages are transmitted from and received by at least one antenna 104 coupled to the radio frequency transmitter/receiver 103. The telephony signals are transmitted to and received from a personal radio telephone 105. The radio frequency transmitter/receiver 103 may also be used to transmit data paging messages to an optional portable receiving device 106. A memory 110 is coupled to the information system 107. Information fields, an index of the information fields, and a list of authorized information fields for each personal radio telephones 105 and portable receiving devices 106 (identified by addresses), stored in the memory 110, are coupled to the system controller through the PSTN by the information system 107. A subscriber data base 115, comprising a list of addresses of subscribing personal radio telephones 105 and portable receiving devices 106 is coupled to the system controller 102.

It should be noted that the system controller 102 is capable of operating in a distributed transmission control environment that allows mixing cellular, simulcast, master/slave, or other coverage schemes for providing reliable radio signals within a geographic usage area. Moreover, as one of ordinary skill in the art would recognize, the telephonic and paging functions may reside in separate system controllers that operate either independently or in a networked fashion.

Figure 2:
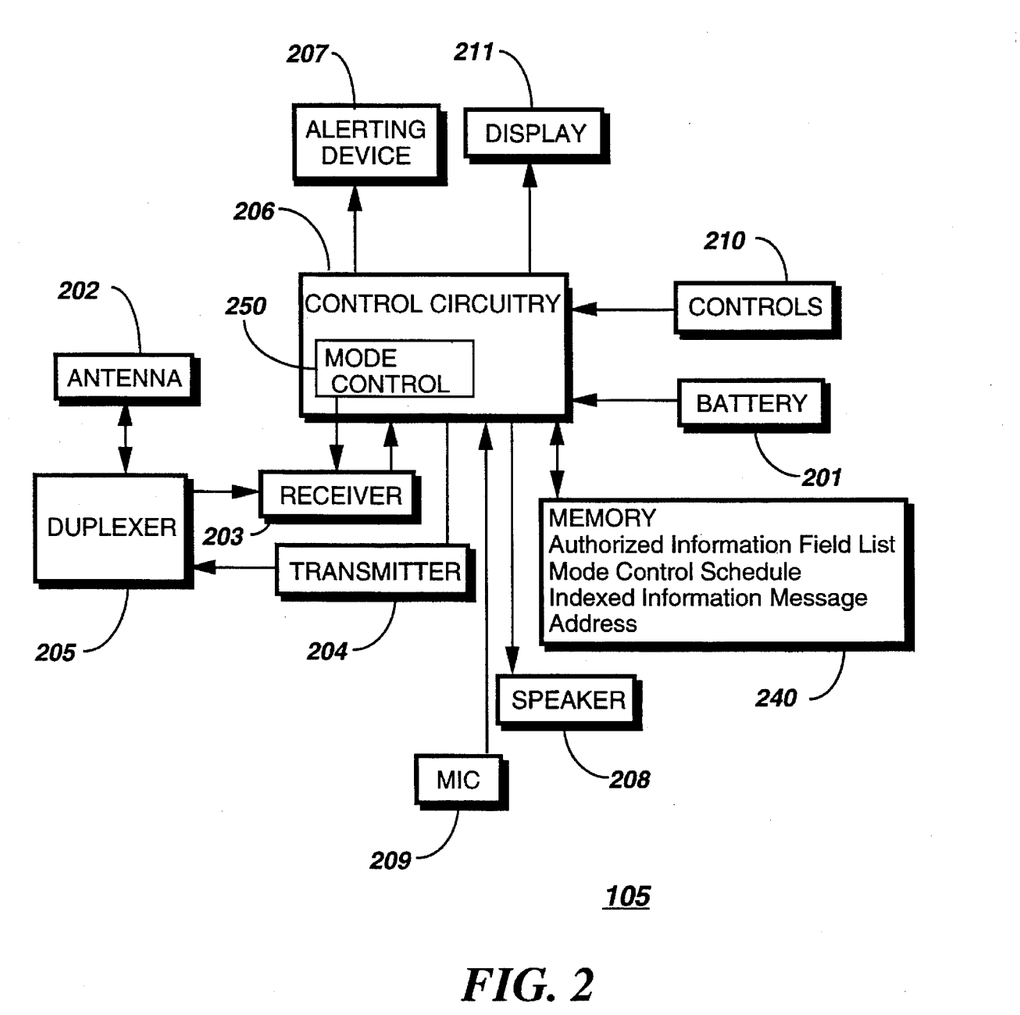
FIG. 2 is an electrical block diagram of a radio telephone depicted in FIG. 1 system suitable for use with the preferred embodiment of the present invention.

Referring to FIG. 2, an electrical block diagram is shown of a personal radio telephone 105 powered by a battery 201. A radio frequency signal is received at a carrier frequency and/or transmitted by an antenna 202. The antenna is coupled to a receiver 203 and a transmitter 204 by a duplexer 205. The received signal is filtered and demodulated by the receiver 203 in a manner well known in the art, and the demodulated signal is coupled from the receiver 203 to a control circuitry 206 such as a microcomputer for recovering any information contained within the received signal. The recovered information is then used by the control circuitry 206 to activate an alert 207 (a ringer in the case of a cellular radio telephone), and after answering the call, to sustain a telephone connection. When the message includes data information, the control circuitry 206 presents the information on a display 211, such was a liquid crystal display. When the telephone connection is completed, the user audibly communicates with another party via a speaker 208 and a microphone 209. The control circuitry 206 routes recovered audio to the speaker 208 which converts electrical energy into acoustical energy thus enabling the user to hear any communications. The microphone 209 is used to convert acoustic energy into electrical energy for use by the control circuitry 206 in modulating the radio frequency carrier produced by the transmitter 204.

The user initiates a call by activating a proper control from a set of controls 210 and entering a number of a party to be contacted. When entering and sending, the number may be presented on the display 211 to provide the user with visual feedback confirming the number entered and subsequently sent.

A memory 240 for storing an authorized information field list, a mode control schedule, an indexed information message, and an address of the portable receiving device 106 is coupled to the controller.

The control circuitry 206 also comprises a mode control means 250 coupled to the receiver 203, which controls power modes of the personal radio telephone 105, The modes include, but are not limited to, a low power mode, during which the receiver 203 is substantially unpowered and information cannot be received, and other portions of the personal radio telephone 105, including but not limited to the control circuitry 206, are substantially unpowered. During a normal power mode the receiver 203 and control circuitry 206 are powered, messages are received and acknowledged, and phone calls are placed. A timing function, for scheduling a return to the normal power mode, is maintained by the control circuitry 206 during the low power mode.

Figure 3:
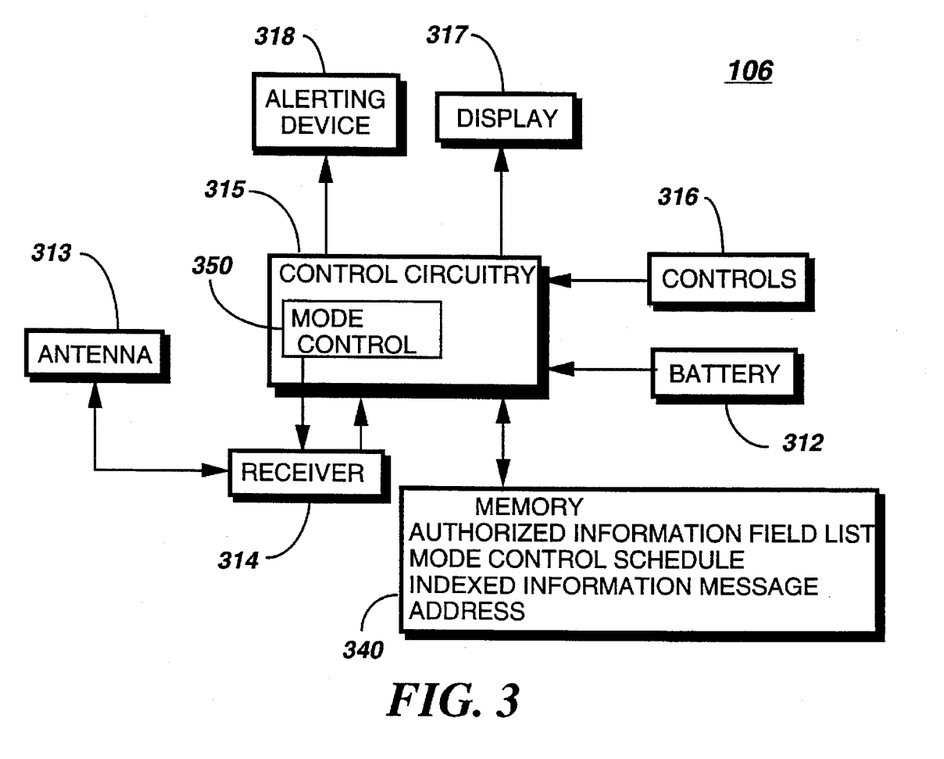
FIG. 3 is an electrical block diagram of a portable receiving device depicted in FIG. 1 system suitable for use with the preferred embodiment of the present invention.

Referring to FIG. 3, an electrical block diagram is shown of a portable receiving device 106 powered by a battery 312. The portable receiving device 106 operates to receive signals via an antenna 313. The receiver 314 operates to filter and demodulate a received signal using conventional techniques and couples a demodulated signal to a control circuitry 315, such as a microprocessor, which decodes and recovers data paging messages contained within the signal, in a manner well known in the art. In accordance with the recovered data paging message and user controls 316, the portable receiving device 106 may present at least a portion of the data paging message, using a display 317, such as a liquid crystal display, and may also signal the user via a sensible alerting device 318 that a message has been received.

The control circuitry 315 also comprises a mode control means 350 coupled to the receiver 314, which controls power modes of the portable receiving device 106. The modes include, but are not limited to, a low power mode, during which the receiver 314 is substantially unpowered and information cannot be received, and other portions of the portable receiving device 106, including but not limited to the control circuitry 315, are substantially unpowered. During a normal power mode the receiver 314 and control circuitry 315 are powered to receive, process, annunciate, and display messages. A timing function, for scheduling a return to the normal power mode, is maintained by the control circuitry 315 during the low power mode.

A memory 340 for storing an authorized information field list, a mode control schedule, an indexed information message, and an address of the portable receiving device 106 is coupled to the controller.

In both the personal radio telephone 105 and the portable receiving device 106, it will be appreciated that the control circuitry 206 or 315 may also comprise a microprocessor or application specific integrated circuit that implements functions such as a signal processor (e.g., a decoder), a conventional signal multiplexer, a voltage regulator that may supply a regulated voltage to other portions of the radio. Alternatively, the associated control circuitry 206 or 315 may include circuits such as analog to digital converters, digital to analog converters, programmable input-output ports, a control bus, environmental sensing circuitry such as for light or temperature conditions, audio power amplifier circuitry, control interface circuitry, a clock or local oscillator frequency synthesizer, and display illumination circuitry. These elements are typically conventionally assembled to provide the marketable features comprising the personal radio telephone 105 or portable receiving device 106 desired by customers. The memory 240 or 340 comprises a random access memory (RAM) and electrically erasable and programmable read only memory (EEPROM), well known to one of ordianary skill in the art.

In the following description, the term portable device will be used to refer to the personal radio telephone 105 or portable receiving device 106 described above.

Figure 4:
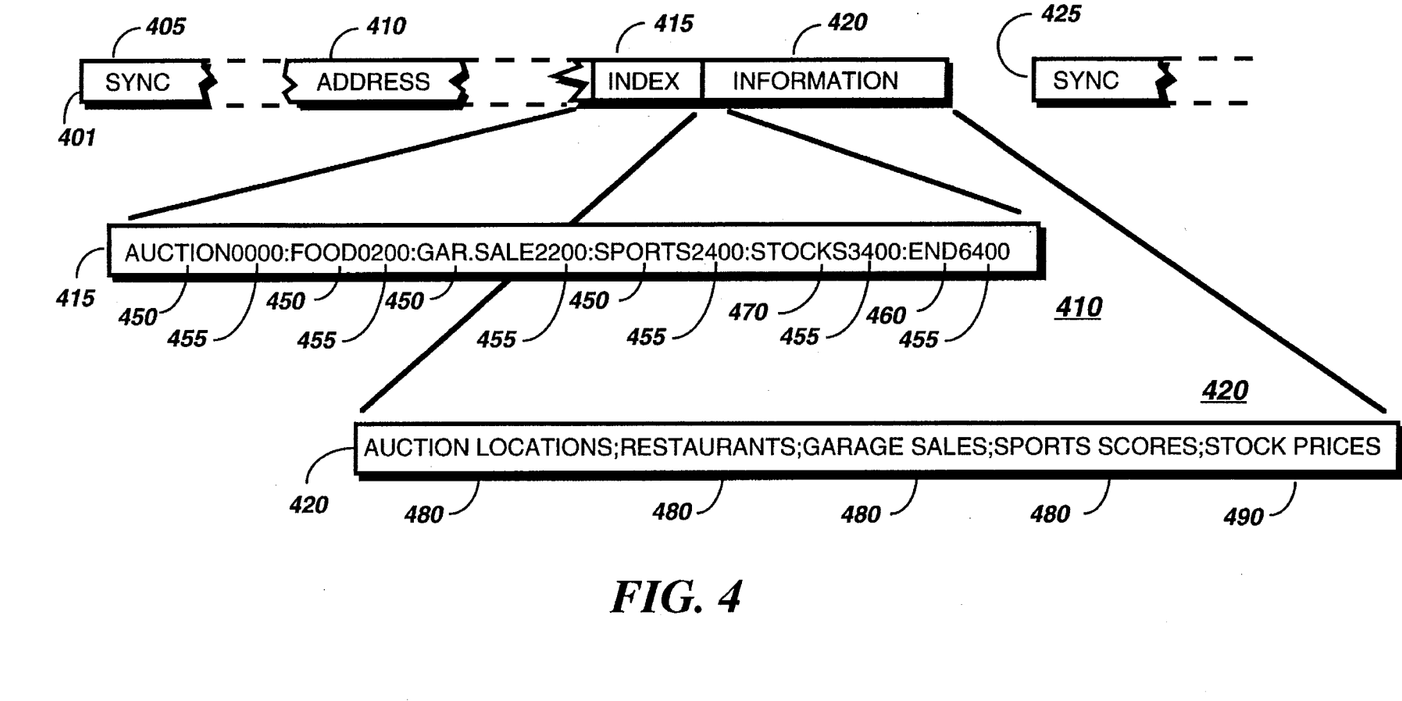
FIG. 4 is a timing diagram illustrating the transmission format of a signaling protocol utilized by the radio communication system of FIG. 1 to transmit a message, in accordance with the preferred embodiment of the present invention.

Referring to FIG. 4, a timing diagram is shown illustrating the transmission format of a signaling protocol utilized by the radio communication system of FIG. 1 to transmit a message 401, in accordance with the preferred embodiment of the present invention. A first portion of the message 401 is a synchronization portion 405, which provides bit, frame, and code word synchronization to the portable device. The message also comprises three portions, an optional address portion 410, an index portion 415, and an information portion 420. The index portion 415 and information portion 420 comprise data words of equal bit lengths, and therefore, time durations. The optional address portion 410 includes selective call, group call, or all call information indicating which portable device or group of the portable devices, operating in the radio communication system, are intended to further process the information within in the message 401. The information is processed in accordance with one or more pre-designated addresses stored within the portable devices, in a manner well known to one of ordinary skill in the art. In some communication systems, the address portion may be eliminated entirely from the message 401, when all portable devices 105 and 106 receiving the message 401 always process the message 401, such as portable information receiving devices. In the preferred embodiment of the present invention, the information portion of the message 401 is typically very lengthy and contains groups, or fields of information intended for more than one portable device. An example of such a message is one that would be found in a communication system offering information services such as stock price quotes, news in a variety of categories, or traffic information for a variety of locations. The address portion 410 of the message 401 is typically a group call or an all call address, intended to identify particular groups of receivers which process the messages 401. Following the optional address portion 410 of the message, is an index portion 415 of the message 401. The index portion 415 follows the address portion at a designated location in the message (location in the sense used herein means temporal location within the serial message sequence), not necessarily adjacent to the address portion. The index portion 415 is generated by the system controller 102, or may be received at the system controller 102 from the information system 107, and is included in the message 401 by the controller 102. The index portion 415 identifies the locations of a plurality of information fields 420, such as information fields 480, including a last information field 490. The data in the plurality of information fields 420 is also generated by the system controller 102, or may be received at the system controller 102 from the information system 107. The locations of the information fields 480 and 490 are identified by a pointer 455 which provides a code word number within the message 401 at which each of the information fields 480 start and at which the last information field 490 ends. The portable device is authorized, either by a message from the system controller 102 or by means of user controls on the portable device, to access some (and perhaps all) of the information fields 480 of the message 401. A second message 425 is shown in FIG. 4 following the message 401. The second message 425 may follow the message 401 without interruption, or there may exist either a synchronous pause (of predetermined duration) or an asynchronous pause (of non-predetermined duration), depending on the system protocol. The considerations of when the next message 401 starts do not affect the benefits provided by the present invention, although they may also influence power conservation in the portable device.

The index portion 415 of the message 401 of FIG. 4, comprises by way of example a list of five information field names 450 including a last information field name 470. Each information field name 450 and 470 is suffixed with a pointer 455 which indicates the code word number at which the information field 480 and 490 starts, in accordance with the preferred embodiment of the present invention. Each information field 480 and 490 ends at the specified code word number, less one, than the number of the pointer 455 of the next information field name 450, except the last information field 490, which ends at the number of the pointer 455 of the end field name, 460.

The information portion 420 of the message 401 of FIG. 4 comprises for example five information fields 480 and 490, each information field 480 and 490 comprising one or more code words of information, in accordance with the preferred embodiment of the present invention. The information fields 480 and 490 are pointed to by the index portion 415 of the message 401. The location of the information fields in the example of the preferred embodiment of the present invention are shown in Table 1. The information in Table 1 is derived from the index portion 415 of the message 401, and a predetermined interpretation of the information field name 450 and 470 used for each information field 480 and 490 indexed in the index portion of the message 401.

TABLE 1

| Information Type | Code Words |
| --- | --- |
| Auction Locations: | 0000–0199 |
| Restaurant Locations: | 0200–2199 |

TABLE 1-continued

| Information Type | Code Words |
| --- | --- |
| Garage Sale Locations: | 2200–2399 |
| Sports Scores: | 2400–3399 |
| Stock Prices: | 3400–6400 |

It will be appreciated that the information field names could be very short abbreviations, or predetermined unique codes, instead of the longer names and abbreviations shown. It will also be appreciated that, in systems wherein the number and definition of the information fields is constant, no information field names are required, only the pointers.

In the preferred embodiment of the present invention, the authorization for further processing of information fields 480 is stored in an authorized information field list within the control circuitry 206 or 315, or a code memory of the portable device, and is used to put the device into the low power mode, during periods of time when unauthorized information groups are present at the receiving antenna, thereby conserving power.

Figure 5:
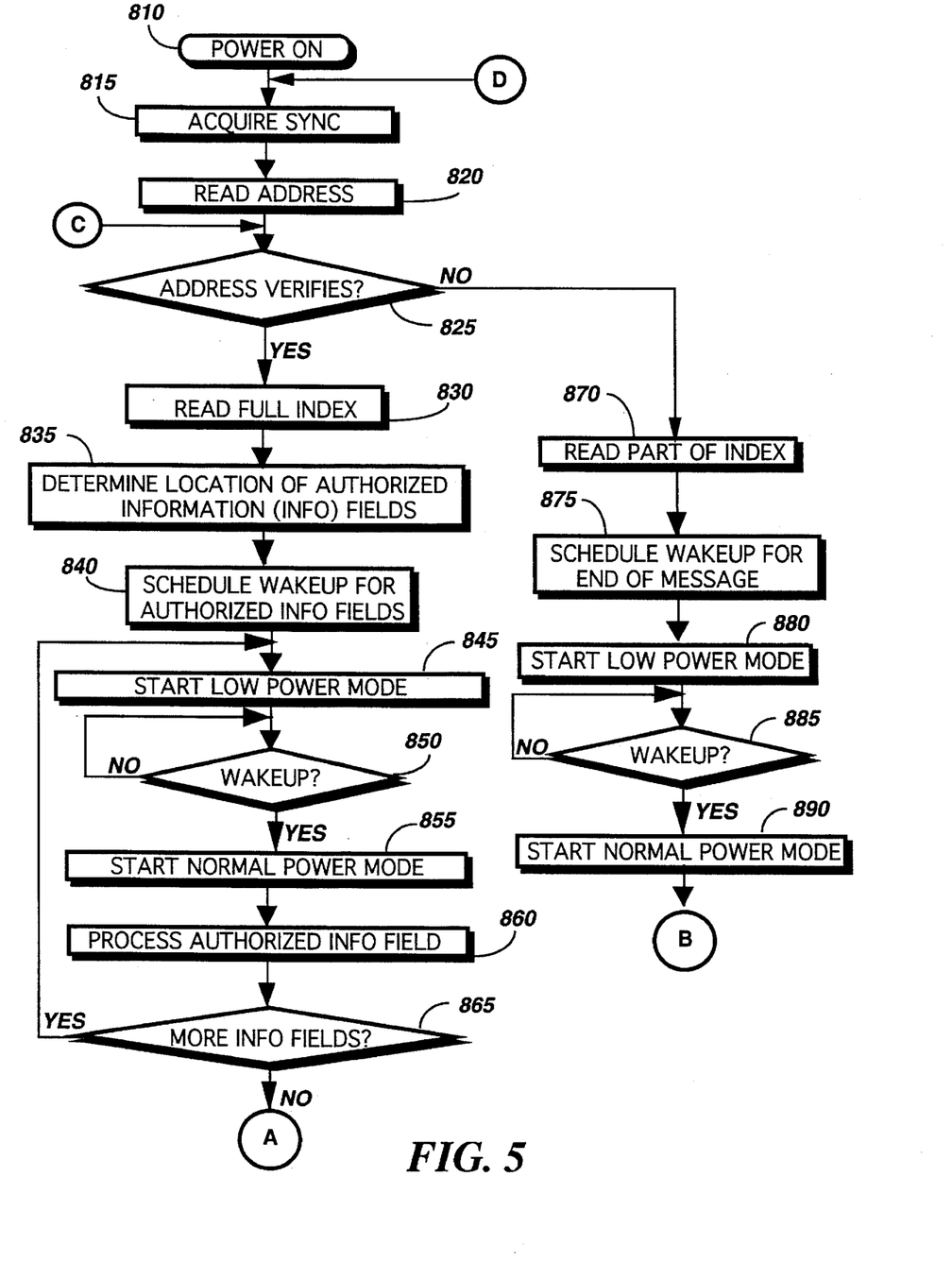
FIG. 5 and FIG. 6 are flow charts illustrating an energy conservation method used in the portable radio devices of FIG. 2 and FIG. 3, in accordance with the preferred embodiment of the present invention.
Figure 6:
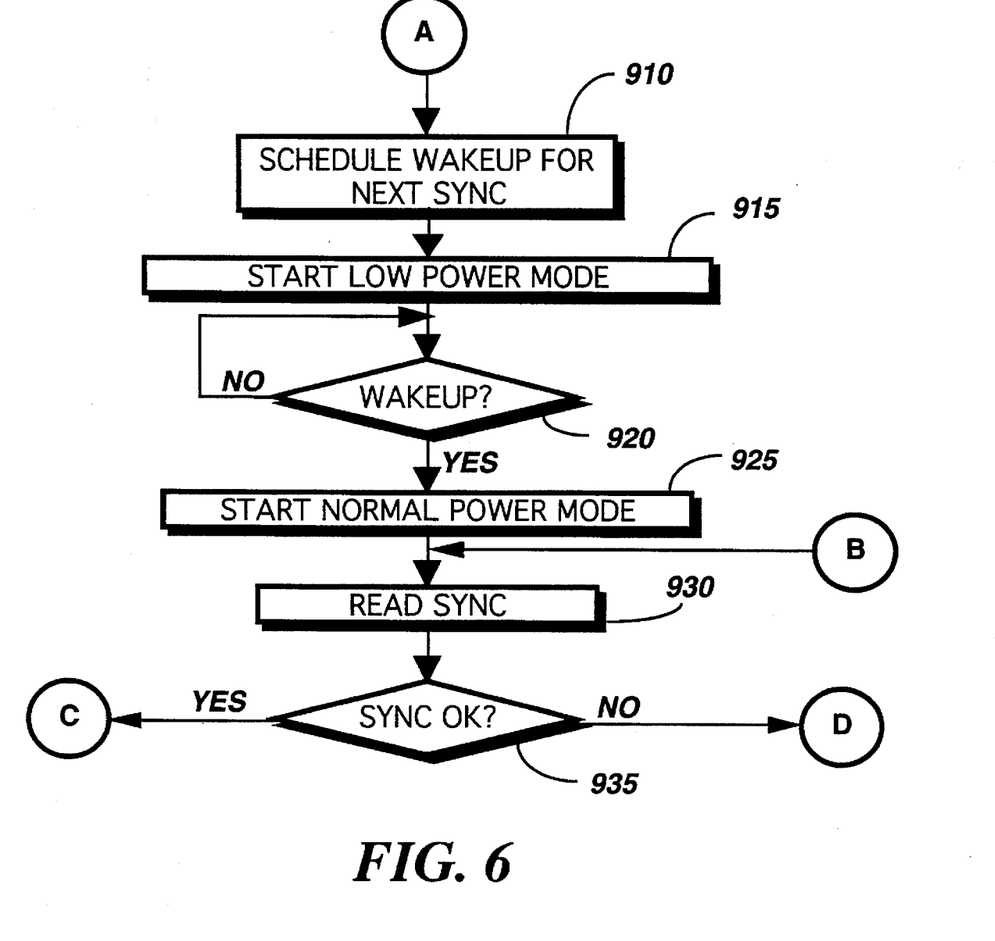

Referring to FIG. 5 and FIG. 6, flow charts are shown illustrating an energy conservation method used in the portable radio devices of FIG. 2 and FIG. 3, in accordance with the preferred embodiment of the present invention. When the portable device is turned on at step 810 of FIG. 5, the control circuitry 206 or 315 receives and acquires synchronization of the message 401, at step 815, which is the first message received after the portable device is turned on. When the portable device is operating in a communication system in which selective call or group call addresses are included in the message 401, the control circuitry 206 or 315 reads the optional address 410 at step 820 and compares it, at step 825, to selective call and group call addresses stored in the memory 240 or 340, at step 820. When the optional address 410 matches the selective or group call address stored in the memory 240 or 340, the control circuitry 206 or 315 receives the index portion 415 of the message 401, at step 830, and compares the information field names 450 in the index portion 415 of the message 401 to a predetermined set of authorized information field names stored in the memory 240 or 340. When a match between these exists, the matched field is an authorized information field, and the control circuitry 206 or 315 determines, at step 835, the code word number at which the authorized information field starts from the number suffixed to the information field name 450 in the index, and determines the code word number at which the authorized information field ends from the subsequent information field name suffixed code word number (or, in the case of a last information field name 470, from the end field 460 suffixed number). From the start and end code words and from a predetermined code word duration, the control circuitry 206 or 315 calculates a time at which the authorized information field starts and ends, relative to the end of the index portion 415 of the message 401. For this example of the preferred embodiment of the present invention, the portable device is authorized to receive the sports scores, which starts at code word 2400 and ends at code word 3399. In this example, the code words are 2.00 milliseconds long (approximating 10 bits of information at 4800 bits per second), so the sports scores field starts 4.800 seconds and ends 6.798 seconds after the index portion 415 of message 401 ends. The control circuitry 206 or 315 repeats this determination for all authorized information fields, at step 835, and from these determinations, generates a power mode schedule, at step 840, which is stored in the memory 240 or 340. At the end of the index portion 415 of the message 401, the control circuitry 206 or 315 starts the low power mode, at step 845. In this mode, substantially the only function which the control circuitry 206 or 315 performs is to monitor a wakeup timer in the control circuitry 206 or 315, at step 850, until a time arrives for the portable device to be returned to the normal power mode, at step 855, for receiving and processing the authorized information field at the scheduled time, at step 860. The processing may comprise storing and displaying the information, or activating an indication of the receipt of the information. A determination is made, at step 865, as to whether additional authorized information fields are scheduled for receipt at step 865. When there are, the method is repeated starting at step 845. When all authorized information fields are received, the control circuitry 206 or 315 schedules, at step 910 of FIG. 6, a start of the normal power mode at the end of the predetermined pause, if any, between the message 401 and the second message 425, as predetermined by the system type, and puts the portable device into the low power mode, at step 915. When the wakeup timer determines the next scheduled wakeup time, at step 920, the control circuitry 206 or 315 puts the portable device into the normal power mode, at step 925, for reading the synchronization portion 405, at step 925, which should be present at the antenna 202 or 313. When the synchronization portion 405 is detected satisfactorily at step 935, the process flow returns to step 825 of FIG. 5. When the synchronization portion 405 is not detected satisfactorily at step 935 of FIG. 6, the process flow returns to step 815 of FIG. 5, to re-acquire synchronization.

When, at step 825, a determination is made that the optional address 410 does not match the selective call address nor any group call address stored in the control circuitry 206 or 315, then the control circuitry 206 or 315 reads part of the index portion 415 of the message 401, at step 870, to determine the entire length of the information fields 480 and 490, by reading only the end field name 460 and the suffixed code word number of the index portion 415. In this example, the number is 6400 (refer to FIG. 4 and Table 1), so the control circuitry 206 or 315 schedules a low power mode for 12.800 seconds, at step 875. The low power mode is started at step 880, at the end of the index portion 415 of the message 401. When the wakeup timer determines the next scheduled wakeup time, at step 885, the control circuitry 206 or 315 puts the portable device into the normal power mode, at step 890. The process flow continues to step 930 of FIG. 6, with the subsequent steps as previously described above.

Figure 7:
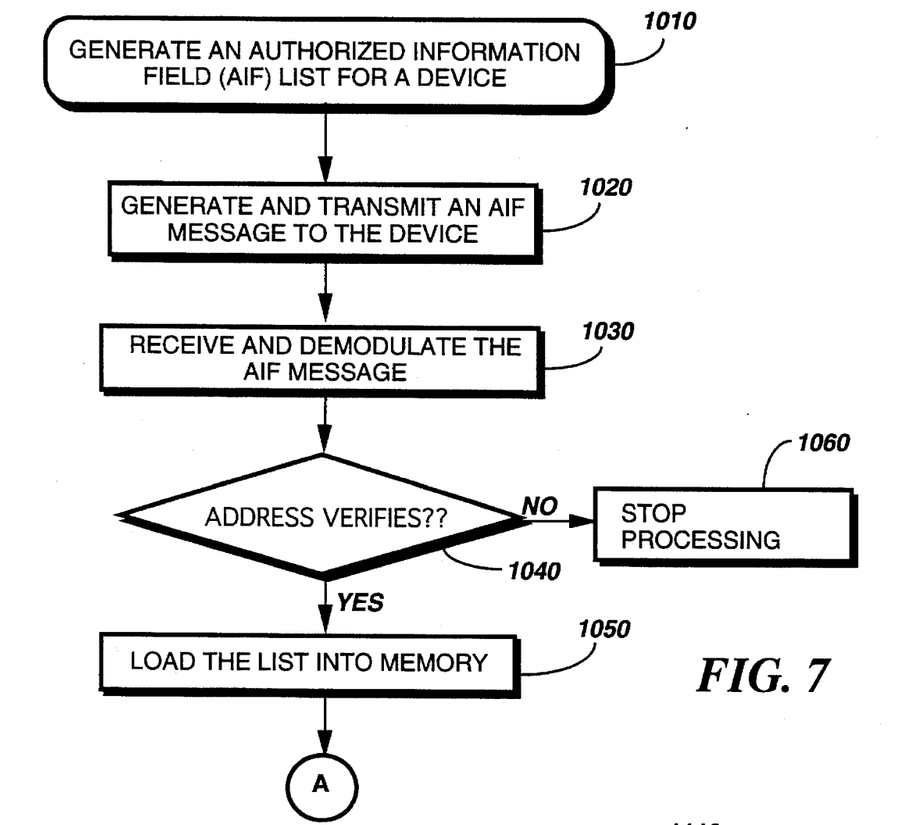
FIG. 7 and FIG. 8 are flow charts illustrating two authorization methods used in the communication system of FIG. 1, in accordance with the preferred embodiment of the present invention.
Figure 8:
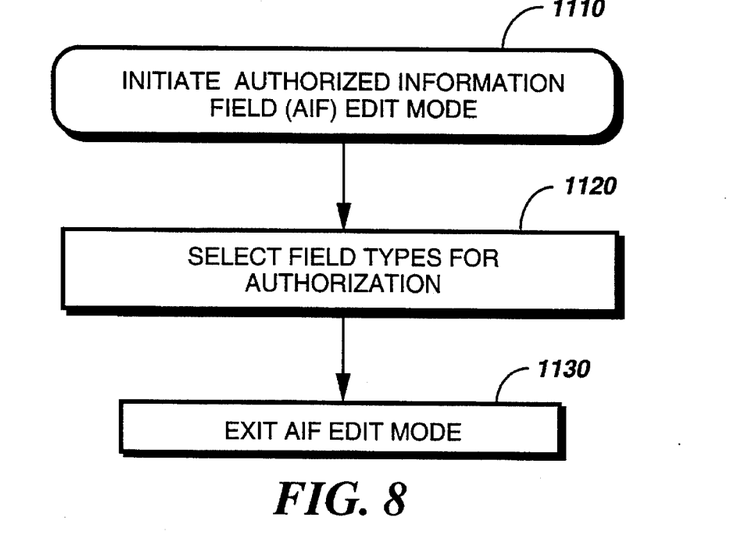

Referring to FIG. 7 and FIG. 8, flow charts are shown illustrating two authorization methods used in the communication system 100 of FIG. 1, in accordance with the preferred embodiment of the present invention.

A central authorization method starts at step 1010 of FIG. 7, when an authorized information field (AIF) list is generated for a particular portable device or group of such devices, by the information system of FIG. 1. This could be, for example, in response to service fees paid for a particular type or set of information. The AIF list is coupled to the system controller 102, which generates, encodes, and transmits, at step 1020, an AIF message containing the authorized field names, as a selective call message or a group call message intended for one or more portable devices. Upon receipt of the AIF message, at step 1030, a portable device demodulates and decodes the message, and compares the address to the selective call and group call addresses of the portable device, at step 1040. When the optional address 410 matches the selective call and group call addresses of the portable device, the AIF names are stored in the control circuitry 206 or 315 memory of the portable device, at step 1050. The control circuitry 206 or 315 then schedules a low power mode returning to step 910 of FIG. 6.

It will be appreciated that the AIF list, in a system having a predetermined quantity and order of information fields, could be simply a short list of true or false values corresponding to whether or not the information fields are authorized, or the AIF list could be a list of only the authorized field names or codes in a system having a varying quantity or changing order of information fields. These and other AIF updating approaches, well known to one of ordinary skill in the art, are possible.

When the address does not match the selective call and group call addresses of the portable device, the message is processed no further, at step 1060.

It will be appreciated that the above method of authorization of information field processing within a portable radio device, in addition to providing a means for energy conservation within the portable device, provides a simultaneous means of controlling which fields the portable processes and is ideal for enhancing the fees paid for such information service. For example, the fees for the service can be proportional to the amount of authorized information, and the information can be de-authorized for selected portable radio devices easily, by radio transmission. It will be further appreciated that the above method of authorization of information field processing within a portable radio device could be used independently from power modes intended to conserve energy.

A local authorization method is shown in FIG. 8, in accordance with the preferred embodiment of the present invention. At step 1110, an authorized field edit mode is initiated by appropriate use of the controls 210 or 316 of the portable device, such a mode control button which steps through a master menu of modes presented on the display 211 or 317. Upon entering the authorized field edit mode at step 1110, the appropriate further use of the controls 210 or 316 selects or deselects each of the predetermined set of all information fields, at step 1120, which have been stored in the control circuitry 206 or 315, either at the time of manufacturer or by a service provider, such as by wire line connected programming tools, or by the download method as described above with reference to FIG. 7. When editing is completed, the edit mode is exited at step 1130, by appropriate use of the controls 210 or 316.

From the description and examples given above, it can be seen that the preferred embodiment of the present invention puts the portable radio device 105 and 106 into a low power mode for considerable periods (multiple seconds) for portions of long information messages containing information either not authorized or not desired. The preferred embodiment of the present invention can be used in a variety of system protocols, from fully synchronous to asynchronous, to increase the battery life of a rechargeable battery, or the battery life of a primary battery. Some additional amount of energy conservation is achieved, when compared to energy conservation systems presently used, whenever any field of information 480 which is longer than the index portion 415 of the message 401 is not authorized for further processing. The percentage of energy conservation generally increases in situations where long information messages are transmitted, and when the authorized fields are a small subset of all the fields.

By now it should be appreciated that there has been provided an method and apparatus which conserves the energy source of a portable radio device operating in a communication system, thereby extending the battery life, and which method and apparatus also provides a means of controlling the processing by the portable radio device of information within messages intended for the portable radio device.

We claim:

1. A radio system for communicating information to one or more portable radio devices having a first operational mode and a second operational mode, the radio system comprising:

a central control terminal comprising:

information index means for generating an encoded indexed information message having an index portion and an information portion, wherein the information portion comprises at least one information field and the index portion comprises, on a one to one basis, at least one corresponding pointer indicating a location of the corresponding information field; and transmission means coupled to said information index means for transmitting the encoded indexed information message; and the one or more portable radio devices, each comprising:

a receiver for receiving the index portion and the information portion of the encoded indexed information message;

a controller having an authorized information field list stored therein, said controller coupled to said receiver for decoding the encoded indexed information message, for processing the index portion and the information portion of the decoded indexed information message, and for generating a mode control schedule determined by the index portion and the authorized information field list; and mode control means, coupled to said controller, for controlling the first and second operating modes of the portable radio device according to the mode control schedule.

2. The radio system according to claim 1, the first operating mode being a low power mode and the second operating mode being a normal power mode.

3. The radio system according to claim 1, the first operating mode being a mode during which an information field is not received and the second operating mode being a mode during which an information field is received and processed.

4. The system according to claim 1, the central control terminal further comprising authorized information field list update means for generating a download message for updating the authorized information field list in the one or more portable radio devices, wherein said transmission means are further coupled to said authorized information field list update means for transmitting the download message, and the portable radio devices further comprising authorized information field list update means coupled to said receiver and said controller for updating the authorized information field list in response to the download message.

5. The system according to claim 1, the one or more portable radio devices further comprising authorized information field list update means coupled to said controller for updating the authorized information field list in response to user control inputs.

6. A portable radio device having a first operational mode and a second operational mode, the portable radio device comprising:

a receiver for receiving an indexed information message having an index portion and an information portion, wherein the information portion comprises at least one information field and the index portion comprises, on a one to one basis, at least one corresponding pointer indicating a location of the corresponding information field;

a controller having an authorized information field list stored therein, said controller coupled to said receiver for decoding the indexed information message including the index portion of the decoded indexed information message, and for generating a mode control schedule determined by the index portion and the authorized information field list; and mode control means, coupled to said controller, for controlling the first and second modes of the portable radio device according to the mode control schedule.

7. The portable radio device according to claim 6, the first mode being a low power mode and the second mode being a normal power mode.

8. The portable radio device according to claim 6, the controller further generating an information portion of the decoded indexed information message, the information portion comprising one or more information fields, and wherein during the first mode selected one or ones of the one or more information fields are not received and during the second mode selected one or ones of the one or more information fields are received.

9. The portable radio device according to claim 6, further comprising authorized information field list update means coupled to said controller means for updating the authorized information field list in response to the download message.

10. The portable radio device according to claim 6, further comprising authorized information field list update means coupled to said controller means for updating the authorized information field list in response to user control inputs.

11. A method in a portable radio device having a first operational mode, a second operational mode, and a authorized information field list stored therein, the method comprising the steps of:

receiving an indexed information message comprising an index portion and an information portion, wherein the information portion comprises at least one information field and the index portion comprises, on a one to one basis, at least one corresponding pointer indicating a location of the corresponding information field;

determining from the index portion and the authorized information field list a mode control schedule; and controlling the first and second operational modes of the portable radio device according to the schedule.

12. The method according to claim 11, the first operational mode being a low power mode and the second operational mode being a normal power mode.

13. The method according to claim 11, the first operational mode being a mode during which an information field is not received and the second operational mode being a mode during which an information field is received and processed.

14. The method according to claim 11, wherein the indexed information message received in said receiving step further comprises an address portion, further comprising the steps of:

comparing for a matching, the address portion of the information message to an address stored in the portable radio device; and when a matching does not result, stopping further processing of the information message.

15. The method according to claim 11 wherein said step of determining further comprises the steps of:

selecting pointers within the index portion of the received indexed information message, said selecting being in correspondence with authorized fields in the authorized information field list; and generating the mode control schedule from the pointers selected in said selection step, the mode control schedule putting the portable radio device into the first mode during periods of reception of authorized information fields and putting the portable radio device into the second mode during other periods within the information portion of the indexed information message.

16. The method according to claim 15 wherein the pointers indicate a starting location of each of the information fields and the step of generating the mode control schedule further comprises the step of selecting the pointer corresponding to each authorized information field and the pointer corresponding to the information field subsequent to each authorized information field to determine the starting and ending location of each field.

17. The method according to claim 15 wherein the index portion of the message further comprises a set of information field names having locations corresponding to the pointers on a one for one basis, and the authorized information field list comprises a list of authorized field names, and the step of selecting the pointers further comprises the step of selecting the information field names in the index portion of the message which correspond to the authorized field names in the authorized information field list, and identifying the pointers corresponding to said selected information field names for said selection of pointers.

18. The method according to claim 17 wherein each information field name is followed directly by the corresponding pointer in the index portion of the message.

19. The method according to claim 15 wherein the quantity and sequential order of information fields in the information portion of the indexed information message is predetermined, and the authorized information field list comprises a list of authorized fields based on the predetermined quantity and order of the information fields, and the step of selecting the pointers, further comprises the step of identifying the pointers corresponding to the authorized information field list for said selection of pointers.

20. In a radio communication system having one or more portable radio devices and information messages intended for reception by the portable radio devices, a method for controlling, during an information portion of the information messages, first and second modes of a portable radio device, the method comprising the steps of:

generating, within a system controller, a message including an authorized information field list intended for the portable radio device;

transmitting, from the system controller, the message intended for the portable radio device;

receiving the message at the portable radio device;

storing the authorized information field list within the portable radio device;

controlling the first and second operational modes of the portable radio device during the reception of an information portion of a subsequently received indexed information message in response to an index portion of the subsequently received indexed information message and the stored authorized information field list, wherein the information portion comprises at least one information field and the index portion comprises, on a one to one basis, at least one corresponding pointer indicating a location of the corresponding information field, said step of controlling further comprising the steps of:

receiving an indexed information message comprising an index portion and an information portion;

determining from the index portion of the indexed information message and the authorized information list a mode control schedule; and controlling the first and second modes of the portable radio device according to the mode control schedule.

* * * * *